(12) United States Patent  
Beesley et al.

(10) Patent No.: US 6,408,973 B1
(45) Date of Patent: Jun. 25, 2002

(54) WHEEL END DISCONNECT SYSTEM

(75) Inventors: Peter Alfred Beesley; Steven G. Goddard, both of Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/696,175

(22) Filed: Oct. 26, 2000

(51) Int. Cl.$^7$ ................................................ B60K 17/34
(52) U.S. Cl. ...................................... 180/253; 180/245
(58) Field of Search ................................. 180/252, 253, 180/254, 255, 263, 233, 245, 246, 247

(56) References Cited

U.S. PATENT DOCUMENTS

| | | | |
|---|---|---|---|
| 2,913,929 A | | 11/1959 | Anderson |
| 4,282,949 A | | 8/1981 | Kopich et al. |
| 4,723,623 A | * | 2/1988 | Teraoka et al. |
| 4,817,752 A | | 4/1989 | Lobo et al. |
| 5,472,062 A | * | 12/1995 | Nagai et al. |
| 5,486,757 A | | 1/1996 | Easley |
| 5,692,590 A | | 12/1997 | Iihara et al. |
| 5,740,895 A | | 4/1998 | Bigley |
| 5,984,422 A | | 11/1999 | Seifert |

* cited by examiner

*Primary Examiner*—Kevin Hurley
(74) *Attorney, Agent, or Firm*—Liniak, Berenato, Longacre & White

(57) ABSTRACT

An integrated wheel end system for a vehicle including a clutch adapted to provide driving engagement/disengagement of a wheel to convert between driven and non-driven modes of wheel movement. A vehicle is provided with both 4×2 and 4×4 capabilities and, when 4×4 capability is required, a negative pressure is applied to a vacuum cavity thus causing a piston, shift fork and spline collar to move inboard. The spline collar is splined to the constant velocity joint and as it moves inboard it locks on the spline plate locking the wheelend to the axle shaft. The invention also provides a default 4×4 embodiment, the spline collar is splined to the joint and as the piston fork and spline collar move inboard, they unlock the wheelend from the axle shaft. A selectively activated actuator is provided for moving the clutch member between its driving and non-driving positions.

14 Claims, 6 Drawing Sheets

WHEEL END DISCONNECT SYSTEM

BACKGROUND OF THE INVENTION

1. Field of the Invention

This invention relates to a wheel end disconnect system, or unit, for a vehicle, and more particularly, to such a system which includes a clutch shiftable between positions for connecting and disconnecting drive and driven components thereof to render selected wheels passive or power-driven.

2. Description of Related Art

This invention has particular application to four-wheel drive vehicles wherein the front wheels or the rear wheels are engaged to be driven by the drive train only as required. For purposes of discussion, the rear wheels will be treated as constantly driven, and the front wheels will be referred to as the set of wheels that are selectively engaged to be driven by the drive train. A transfer case coupled to the vehicle transmission has suitable gearing to be engaged or disengaged as needed. The engagement of the transfer case gearing selectively supplies power to the front drive train which will drive the front wheels. It is desirable to be able to engage the front wheels with the front drive train when the front drive train is under power and to disengage the wheels when the front drive train is idle. This disengagement of the front wheels from the drive train prevents forced rotation of the drive train as a result of the front wheels being driven as the vehicle is propelled.

It thus will be appreciated that in the example given, there are two positions in the drive train in which a connect/disconnect mechanism is required. For purposes of explanation, the invention will hereafter be discussed merely in relation to a wheel end unit, recognizing that such can be either for a front wheel or a rear wheel, depending upon which portion of the vehicle has primary drive function.

Generally in four-wheel drive vehicles where a connect/disconnect hub system is provided, the vehicle has a support coupled to the frame of the vehicle defining a bearing for the hub, and the wheel is mounted laterally outwardly on the vehicle from the support. Prior connect/disconnect hub systems usually are mounted laterally outwardly from the support and within the confines of the center of the wheel.

These prior devices generally have required units which extend laterally outwardly beyond the vehicle to house the operating mechanism necessary to provide the connect/disconnect feature. Since such must fit within the confines of the central portion of the wheel, they generally have had smaller diameter parts which rotate relative to each other in a disconnect position, and have splines or other interlock means which interconnect to lock them for driven operation. Due to part diameter limitations such prior devices have required substantially heavy elements to transmit the necessary torque to the wheel under driving conditions.

Further, such prior hubs have had laterally outwardly extending portions which may unsightly or produce other disadvantages.

In prior connect/disconnect hub units bearing sets provided between the support and the hub often have required specially designed bearings and supports due to the configurations of the hub units. Further, the axial dimensions of prior hub units have been such that often it has been difficult to obtain a desirable scrub radius, or steering offset. Furthermore, the scrub radius, or steering offset, may be defined as the distance between the point at which an extension of the king pin axis meets the road surface and the center of the area, or patch, of contact between the tire and the road. Zero offset, or scrub radius, occurs when the king pin axis line intersects the center of the area of contact between the tire and road surface. Positive offset occurs when the king pin axis line is spaced laterally relative to the vehicle from the center of the tire/road contact area. Negative offset occurs when the king pin axis line intersects the road laterally outwardly relative to the vehicle beyond the center of the tire/road contact area. Appropriate steering offset, or scrub radius, often has been difficult to obtain with prior devices.

SUMMARY OF THE INVENTION

A general object of the present invention is to provide a wheel end disconnect system including a clutch system which is adapted to provide driving engagement and disengagement (connect/disconnect) of a wheel to convert between driven and non-driven modes of wheel movement which overcomes the above-noted disadvantages of prior systems.

Yet another object of the present invention is to provide a novel clutch system in which the actuating mechanism to engage/disengage between driven and non-driven modes is mounted in a relatively protected region inwardly on the primary support and is simple and effective in its operation.

A still further object and advantage of the present invention is to provide a novel integrated wheel end unit which permits reduction of the scrub radius, or steering offset, to provide optimum driving performance.

More specifically an object of the present invention is to provide an inboard wheel end disconnect mounted to the tube yoke to connect the inboard side of the constant velocity joint to the axle shaft. The invention provides a system which includes clutch member shiftable between engaged and disengaged positions, whereby the clutch member is positioned laterally inside the constant velocity joint.

In accordance with one embodiment of the invention, a vehicle is provided with both 4×2 and 4×4 capabilities and, when 4×4 capability is required, a negative pressure is applied to a vacuum cavity thus causing a piston, shift fork and spline collar to move inboard. The spline collar is splined to the constant velocity joint and as it moves inboard it locks on the spline plate locking the wheelend to the axle shaft. The invention also provides a default 4×4 embodiment, the spline collar is splined to the joint and as the piston fork and spline collar move inboard, they unlock the wheelend from the axle shaft.

DESCRIPTION OF PREFERRED EMBODIMENT

Figure 1:
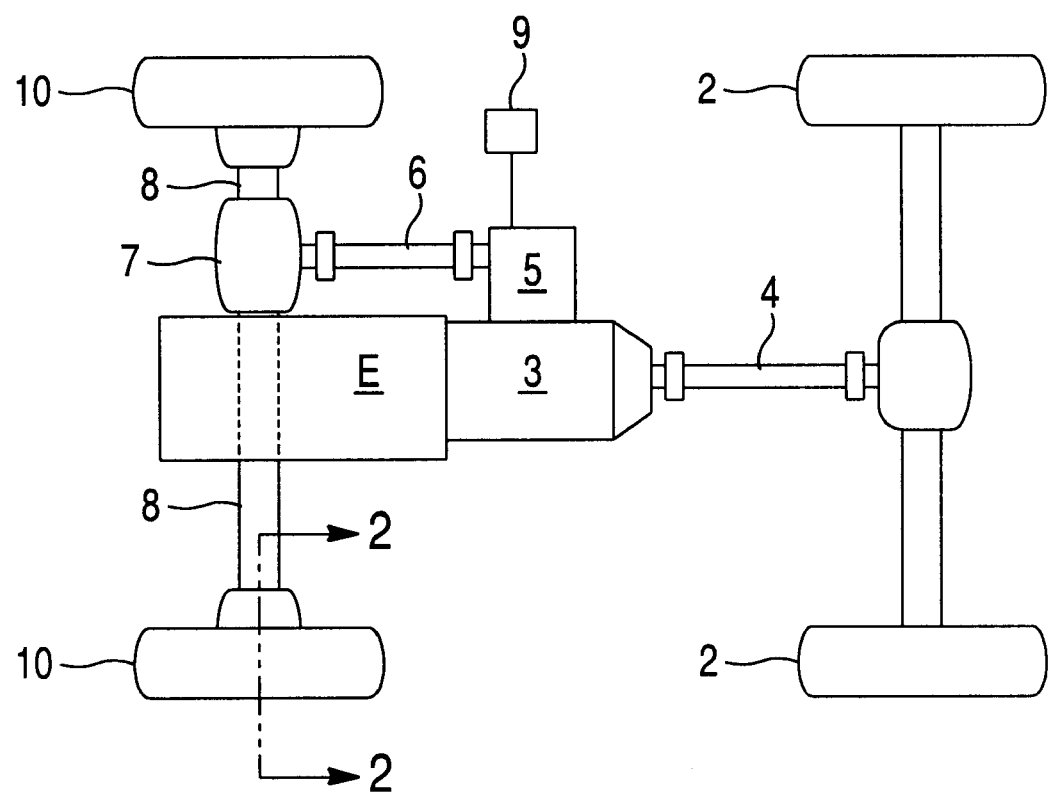
FIG. 1 is a schematic view of a vehicle drive system as contemplated incorporating the present invention.

Referring now to FIG. 1, this illustrates the drive mechanism for a part-time four-wheel drive vehicle. The rotative power of the vehicle engine E is transmitted to the rear wheels 2 by a transmission 3 rotating a rear propeller shaft 4. In the embodiment described herein, the rear wheels 2 are the primary drive wheels and generally are driven full time.

The rotative power of engine E is transmitted to the front wheels 10 by a transfer case 5, coupled to transmission 3, that rotates a front propeller shaft 6 coupled to a front differential 7. Axles, or drive shafts, 8 extend laterally outwardly to opposite sides of the center of the vehicle from differential 7 to rotate front wheels 10. The wheels 10 are mounted on wheel end assemblies or hubs 14 which are not visible in FIG. 1, but which are illustrated in subsequent figures and further described below.

As is known, the transfer case 5 has shift mechanism, which may be actuated by an operator from a remote location on the vehicle through a selector indicated at 9, to either provide rotative power to the front propeller shaft 6 or to not provide such rotative power. Thus, the vehicle may be operated in two-wheel drive (wherein only rear wheels 2 are driven) or in fourwheel drive (where all of wheels 2 and 10 are driven) depending on the shift selection of the transfer case.

Figure 2:
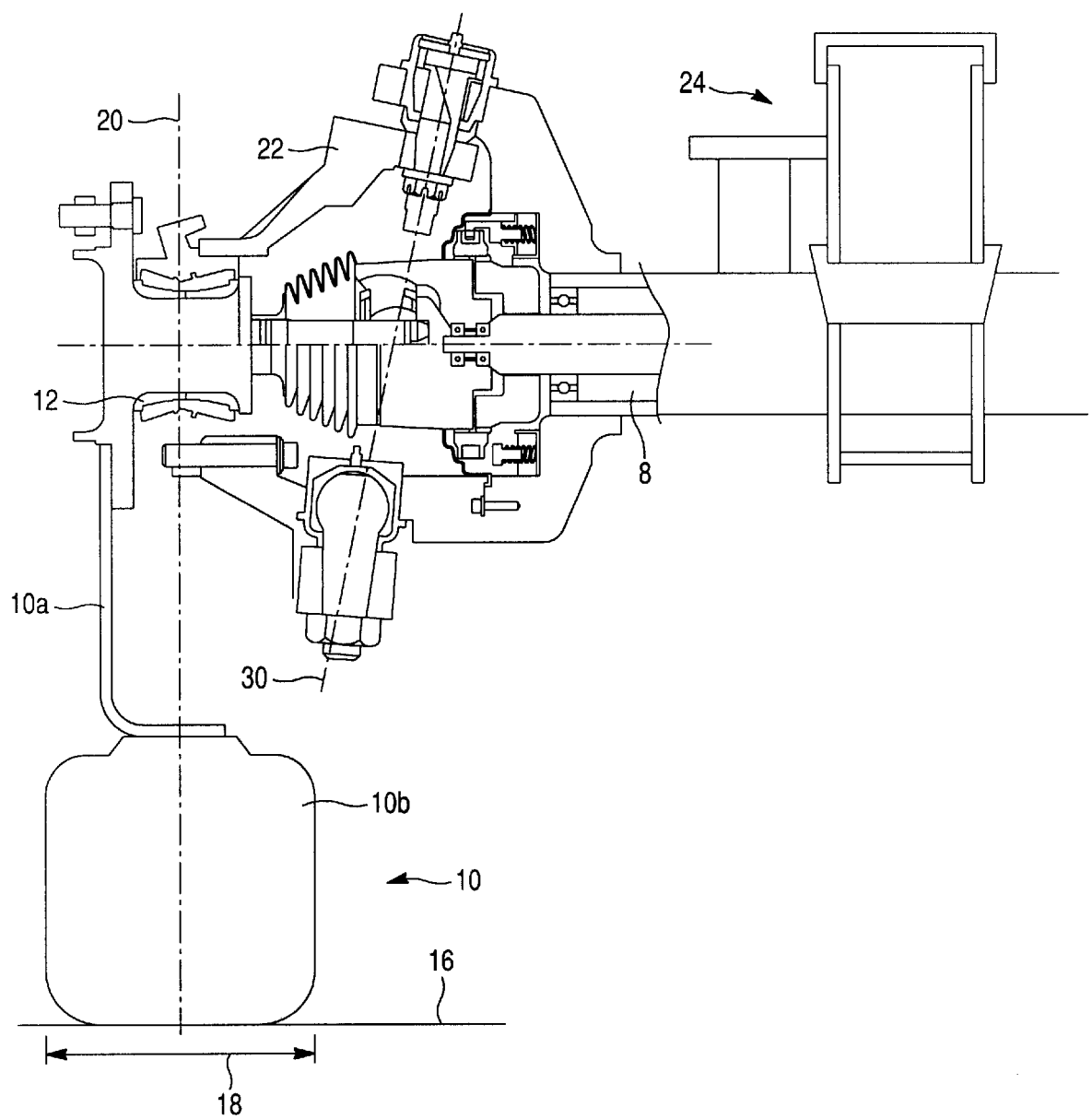
FIG. 2 is an enlarged schematic view taken generally along line 2—2 in FIG. 1 with a wheel end disconnect system according to an embodiment of present invention mounting a wheel.

Referring to FIG. 2, each of wheels 10 includes a wheel portion 10a and tire portion 10b. Wheel 10 is secured to a wheel mounting rotor 12 mounted on the vehicle by a wheel end system, or unit 14, constructed according to an embodiment of the present invention.

Tire 10b runs on a road surface 16 and contacts the road surface in a contact area, or patch, denoted generally at 18. A vertical center line 20, bisects the wheel and patch 18.

A steering knuckle, or support, 22, is coupled, or mounted, to the vehicle frame through suspension structure 24. The axis about which the wheel is pivotable, or steerable, is termed the king pin axis, denoted at 30. With the structure of the wheel end unit of the present invention, the king pin axis 30 may be positioned to intersect center line 20 where such meets the road, as indicated in FIG. 2. This produces what is referred to as zero offset, or scrub radius.

Axle drive shaft 8 is connected at its outboard end to wheel end system 14, and remainder portions thereof extend laterally inwardly toward the center of the vehicle to operative drive connection with differential 7.

The usual operation of such a vehicle is to have one set of wheels constantly driven (such as the rear wheels) and the other set of wheels (such as the front set of wheels) engaged for driving under power as needed. Driving power is transmitted to the front wheels by the transfer cases which may be actuated either by the operator or actuated automatically in an on-demand basis, dependent upon the type of transfer case used.

Figure 3:
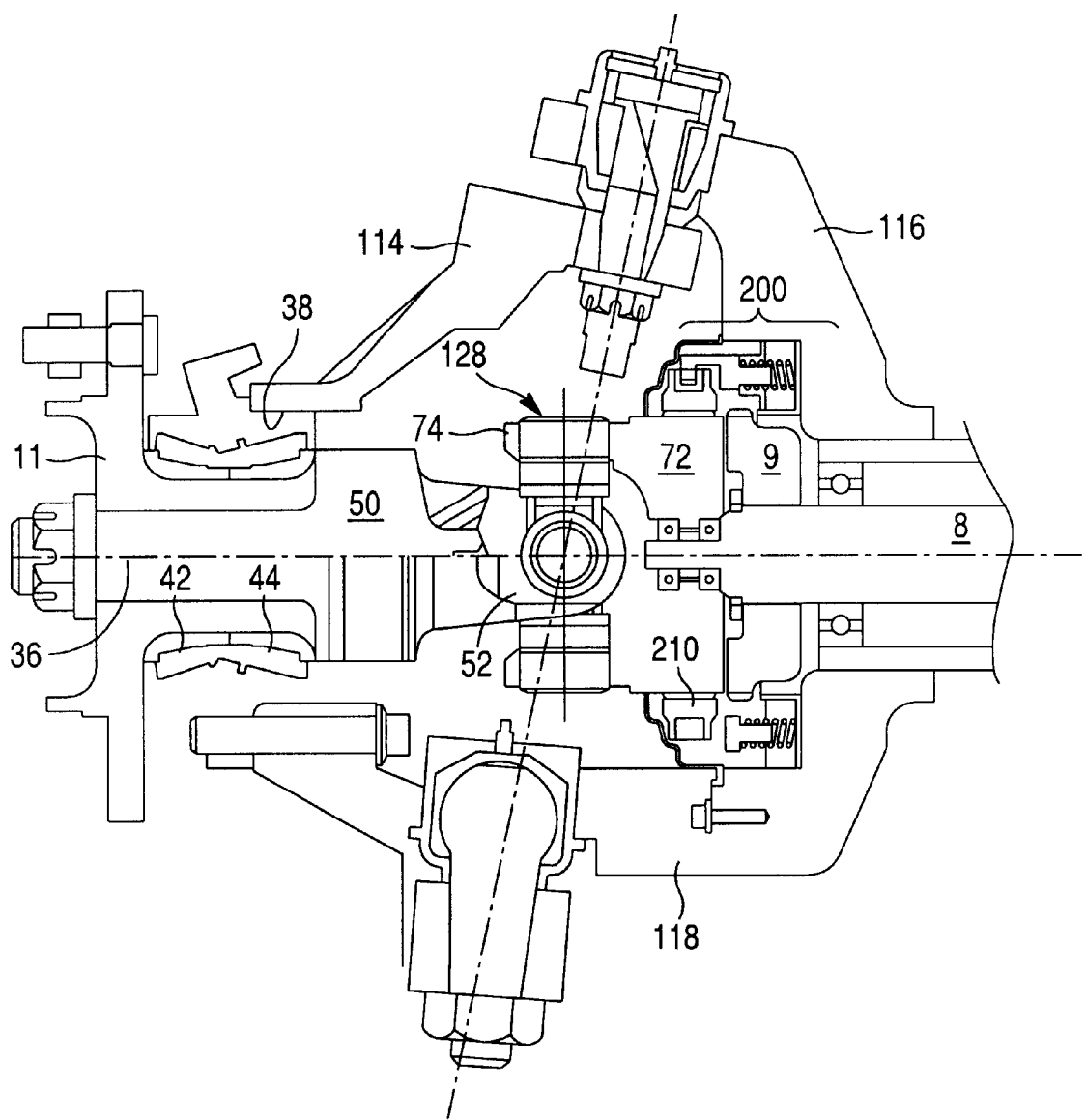
FIG. 3 is an enlarged cross-sectional view of a wheel end disconnect system constructed according to an embodiment of the present invention taken generally along line 2—2 in FIG. 1.

FIG. 3 illustrates in an enlarged cross-sectional view, a wheel end disconnect unit, or system, 14 according to an embodiment of the invention. It will understood that the axle drive shaft 8 and wheel 10 can remain coupled and the vehicle shifted between two-wheel and four-wheel drive solely through the actuation of the transfer case. However, if clutch mechanism, as will be described in greater detail below, in the wheel end unit remains coupled to the axle when the vehicle is driven in two-wheel drive mode, the wheels 10 will force rotation of axle 8. This is undesirable as it consumes power and causes unnecessary wear to the portion of the drive train connected to axle 8. The front wheels 10 thus preferably are drivingly connected to axles 8 only while operating the vehicle in four-wheel drive.

FIG. 3 illustrates a portion of a knuckle or support 114, an outer end portion of axle 8, a portion of a wheel end 11 and clutch mechanism for coupling and uncoupling the wheel to the axle. The wheel mounting is of the live spindle type, as used herein meaning that the spindle provides bearing support for the wheel. The assembly has a central axis 36 extending laterally of the vehicle.

As mentioned previously, knuckle 114 is supported on the frame of the vehicle through the tube toke having support arms 116, 118 defining a suspension structure. The knuckle, or support, has an internal cylindrical bore 38 defining a bearing enclosure.

A pair of spaced apart roller bearing assemblies 42, 44 are mounted and supported in bearing enclosure or bore 38. The bearing assemblies include inner bearing races and outer bearing races. The radially inwardly facing surfaces of races are inclined at opposite angles relative to central axis 36 of the assembly, whereas the radially outwardly directed faces of inner races are inclined at angles parallel to the facing surfaces of their respective outer races. A plurality of rollers is rotatably received between the inner and outer races. The structure of the system of the invention is such that standard, commercially available bearing assemblies may be used.

FIG. 3 shows an independent suspension for a steering drive wheel. The suspension comprises a steering knuckle 114 pivotally mounted by ball joints to upper and lower arms 116, 118 which in turn are mounted to the axle tube for the drive axle 8. The wheel 10 is steered by pivoting the steering knuckle about the steering axis established by the ball joints. The steering gear and linkage for pivoting the steering knuckle 114 have been omitted in the interest of clarity. Power from the engine is delivered through a drive train (not shown) to a differential mounted on the frame structure. The drive axle 8 for the wheel 10 is designed to selectively deliver torque to a stub shaft 50 through the universal CV joint.

The stub shaft 50 is journaled within bearings 42, 44 mounted within the bore 38. The driving connection between inner end of the stub shaft 50 and the outer end of the drive axles is accomplished through a conventional universal joint that includes a drive yoke 72 disposed laterally outside the outer end of the drive axle 8, the drive yoke 72 has its arms 74 attached to the yoke/ring 52 of the stub shaft 50 for pivotal movement.

A clutch unit 200 is disposed along the drive axle 8 to selectively provide driving engagement and disengagement (connect/disconnect) of a wheel to convert between driven and non-driven modes of wheel movement which overcomes the above-noted disadvantages of prior systems. The clutch unit 200 of the present invention comprises a clutch sleeve 210 provided with inner splines that matingly engage external splines on the flange of the drive yoke 72 as well as external splines on the drive shaft 8. The drive yoke thereby acts as an input member that delivers torque to the steerable joint. In the preferred embodiment of this invention, a hub member 9 is splined onto the lateral end of the drive axle 8, and the hub member 9 is provided with external splines that mate with the clutch sleeve 210.

In the first embodiment of the invention shown in FIG. 3, the clutch unit 200 is designed to provide a default 4×2 system such that the clutch sleeve 210 is biased by a spring or other suitable means into a disengaged position. In the position shown in FIG. 3, the clutch sleeve 210 is not engaged with the hub member 9; thus, torque is not delivered from the drive shaft 8 to the stub shaft 50 or the wheel 10.

When 4×4 capability is required, a negative pressure is applied to the vacuum cavity 220. The negative pressure causes the piston 230, the shift fork 232 and the clutch sleeve 210 to move in the inboard direction (rightward direction in FIG. 3). The spline collar 210 is splined to the joint 72 and, as the collar 210 move in the inboard direction, it locks onto the spline plate or hub member 9 locking the wheel end to the axle shaft 8 (see FIG. 4).

Because the clutch members of this invention are mounted inboard of the steerable joint and to the tube yoke or axle tube, as opposed to the knuckle or hub, the hub locking system may be installed without having an increase in scrub radius.

Figure 5:
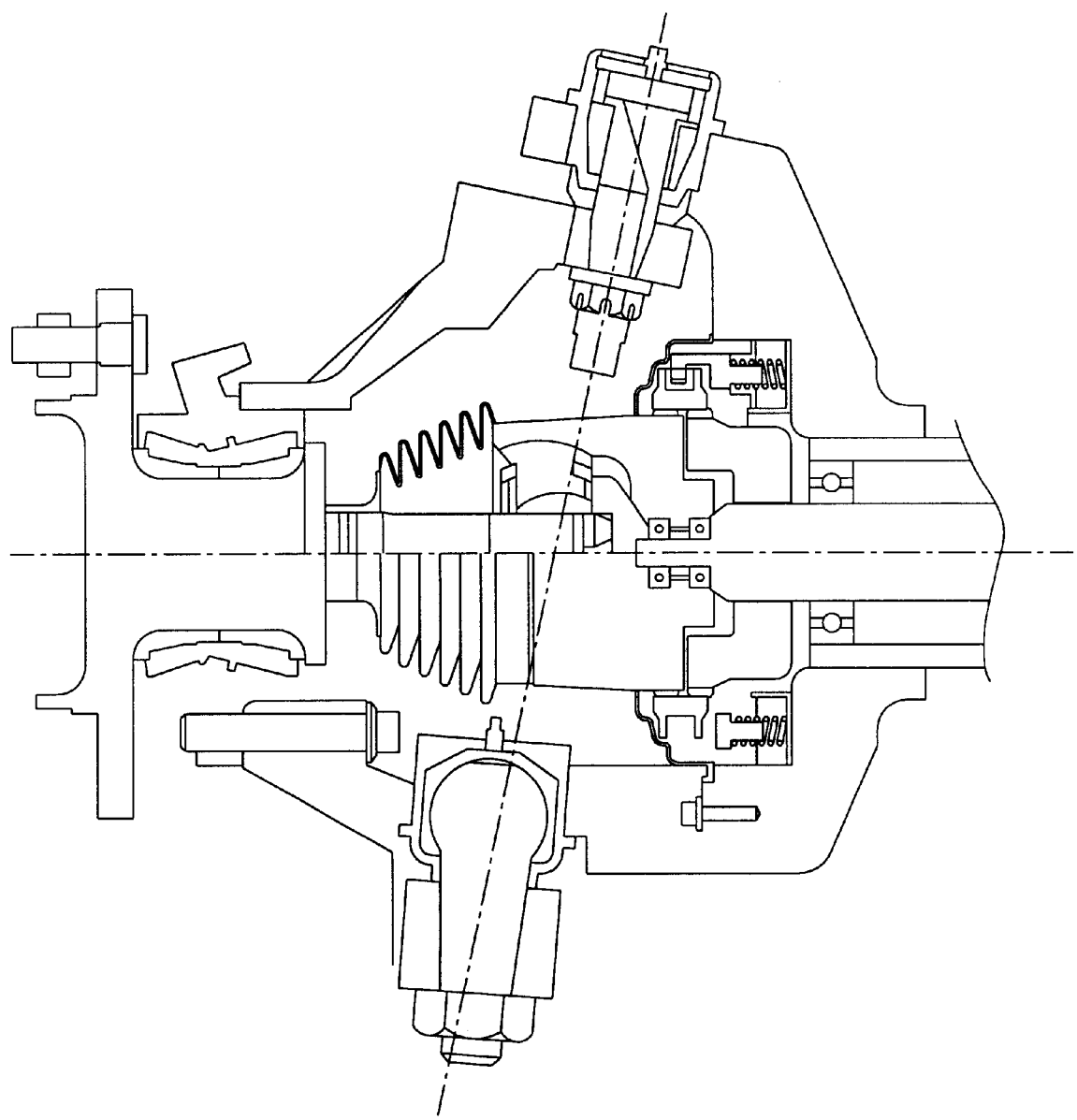
FIG. 5 is an enlarged cross-sectional view of an alternate embodiment of the invention.
Figure 6:
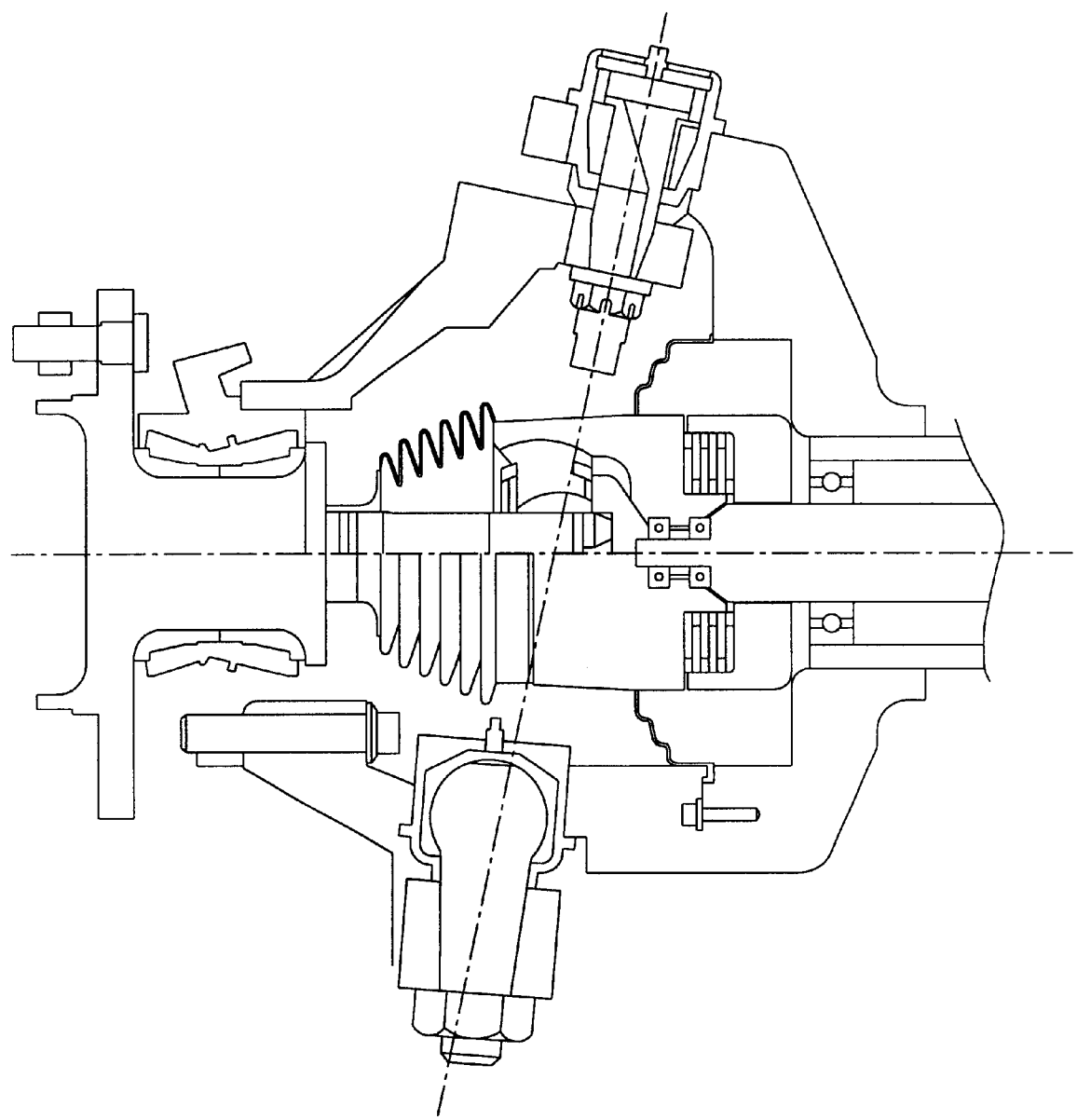
FIG. 6 is an enlarged cross-sectional view of another alternate embodiment of the invention showing a clutchpack with interleaved plates.

An alternate embodiment of the present invention is shown in FIG. 5 where the spline plate or hub member 9 is in the normally-engaged position (default 4×4); thus, when the spline plate or hub member 9 moves inboard, it unlocks the wheel end from the axle shaft.

Figure 4:
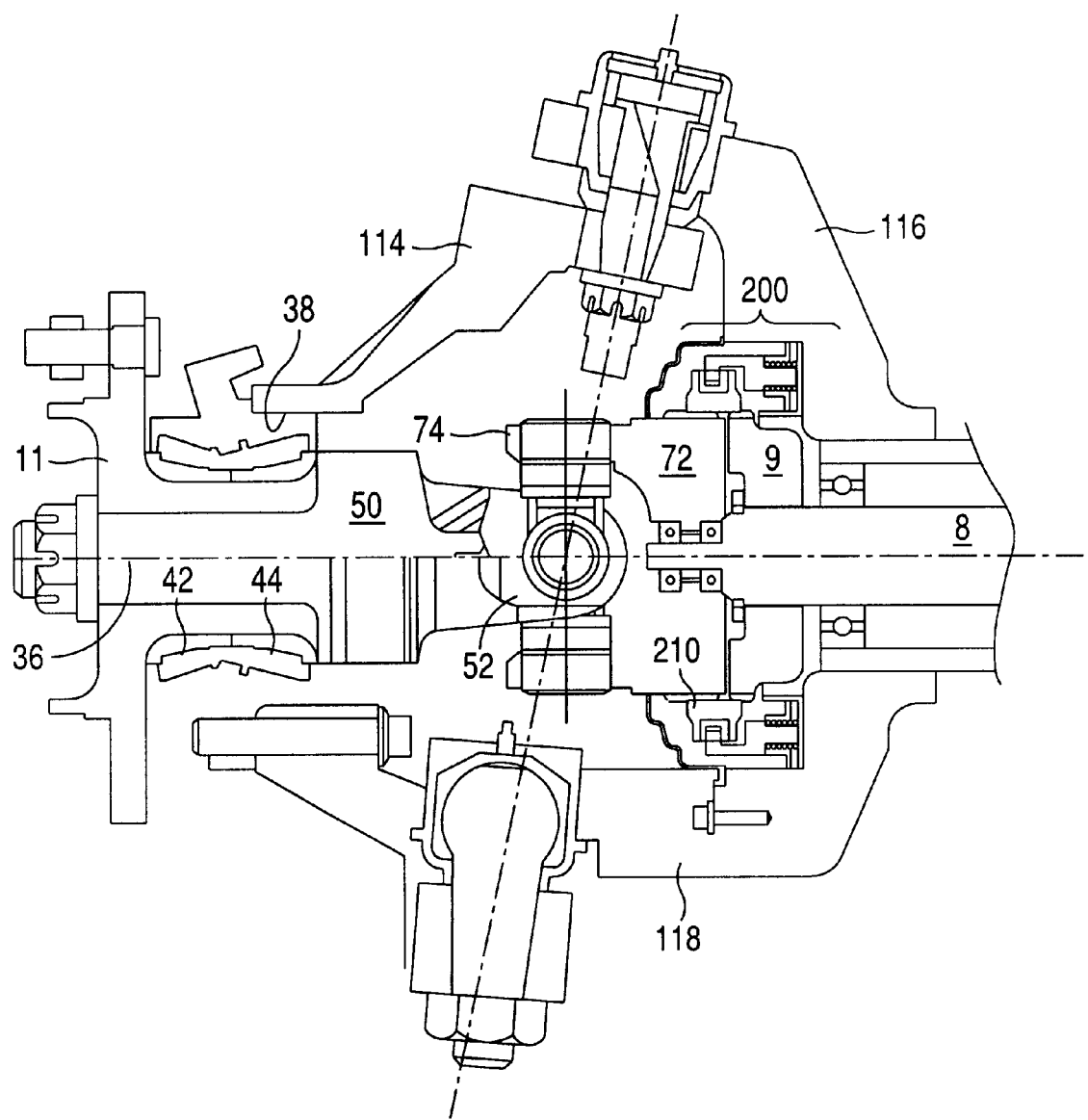
FIG. 4 is an enlarged cross-sectional view similar to FIG. 3 showing the clutch mechanism of this invention in a locked or engaged state.

Although a fluid pressure actuator is illustrated in the embodiment of FIGS. 3 and 4, it should be recognized that other forms of shifting mechanisms may be used in the device also. These could be in the form of hydraulics, solenoids, other pneumatic devices, flexible cables, mechanical cams, fork interconnections, and many others.

Although preferred embodiments of the invention have been described herein, it should be apparent to those skilled in the art that variations and modifications are possible without departing from the spirit of the invention. For example, the clutch mechanism of the present invention may take many forms including the splined-collar arrangement shown in FIGS. 3 and 4; alternately, a clutch pack may be employed in place of the splined collar to effect torque transmission. Other clutch assemblies may also be employed without departing from the scope of this invention. Likewise, the drawings figures illustrate a constant velocity joint in FIG. 5 as well as a Cardan join, but any type of such steerable joint (steerable joint is intended to encompass any type of universal joint) known to those skilled in the art may be employed in the instant invention without departing from the scope of the invention, whether or not actual steering operations are employed.

What is claimed is:

1. A wheel end system for a vehicle including a clutch adapted to provide driving engagement/disengagement of a wheel to convert between driven and non-driven modes of wheel movement, said system comprising:
   a drive element adapted to be rotated by a differential assembly, said drive element comprising a drive axle extending from said differential assembly and supported within an axle tube by a bearing assembly at an output terminal end of said axle tube;
   a wheel end adapted to be driven by said drive element in said driven mode;
   a steerable joint interposed between said drive element and said wheel end to permit said wheel end to pivot with respect to said drive element; and
   a clutch member mounted outboard of said bearing assembly and inboard of said steerable joint between said drive element and said steerable joint, said clutch member movable between a first position where said drive element is coupled to an input member of said steerable joint to produce a driving connection therebetween whereby the wheel end is driven by powered rotation of the drive element and a second position in which no driving connection is produced permitting the wheel end to rotate freely of the drive element.

2. The system of claim 1, wherein engaging elements on the input member and drive element comprise outwardly directed teeth disposed at the outer peripheral edges of the input member and drive member, and said clutch member comprises a shift collar having radially inwardly directed teeth which engage the teeth on the input member and drive element when in the first position and are out of engagement with the teeth on at least one of the spindle and drive element in the second position.

3. The system of claims 1, wherein engagement elements on the input member and drive element comprise a clutch pack comprising a series of interleaved plates alternately fixed to the input member and drive element to permit a locking engagement therebetween in said first position and relative rotation in said second position.

4. The system of claim 1, wherein said drive element comprises a primary shaft and a spline plate splined onto said primary shaft, said spline plate defining said outwardly directed teeth disposed at the outer peripheral edges of the drive member.

5. The system of claim 1, wherein said input member is integrally formed with a drive yoke and arm of said steerable joint.

6. The system of claim 5, wherein said clutch member is mounted within an axle tube yoke provided for said drive element.

7. The system of claim 5, wherein said steerable joint is any type of universal joint, a Cardan joint, a constant velocity joint and any other joint that allows shafts to turn or swivel at an angle.

8. A wheel end system for a vehicle including a clutch adapted to provide driving engagement/disengagement of a wheel to convert between driven and non-driven modes of wheel movement, said system comprising:
   a drive element adapted to be rotated by a differential assembly;
   a wheel end adapted to be driven by said drive element in said driven mode;
   a steerable joint interposed between said drive element and said wheel end to permit said wheel end to pivot with respect to said drive element;
   a clutch member mounted inboard of said steerable joint between said drive element and said steerable joint, said clutch member movable between a first position where said drive element is coupled to an input member of said steerable joint to produce a driving connection therebetween whereby the wheel end is driven by powered rotation of the drive element and a second position in which no driving connection is produced permitting the wheel end to rotate freely of the drive element; and
   a shifting mechanism for selectively shifting the clutch member between said first and second positions,
   wherein said shifting mechanism comprises an actuator selectively operable to induce a force operable to move the clutch member from one of said positions to the other of said positions, and biasing means acting against the clutch member to urge movement of the clutch member in the opposite direction, said biasing means generating less force than said actuator.

9. The system of claimed 8, wherein said shifting mechanism comprises a vacuum cavity, said clutch member being shifted when a negative pressure is applied to said vacuum cavity.

10. The system of claim 8, wherein said actuator comprises an electromagnetic device which when activated produces shifting of the clutch member.

11. The system of claim 8, wherein said actuator comprises a fluid pressure device which when activated produces shifting of the clutch member.

12. An integrated wheel end system for a vehicle including a clutch adapted to provide driving engagement/ disengagement of a wheel to convert between driven and non-driven modes of wheel movement, said system comprising,
- a knuckle support coupled to the frame of the vehicle defining a bearing enclosure,
- an elongated cylindrical spindle rotatably mounted within the bearing enclosure having an outer end portion spaced outwardly from the support adapted to have a wheel mounted thereon, an inner portion disposed inwardly toward the center of the vehicle from the outer end portion, said inner portion being coupled to a steerable joint;
- a flange extending radially outwardly from an inboard side of said steerable joint having teeth arrayed about the periphery thereof,
- an axle adapted to be driven under power and having a connector portion adjacent at least one of a tube yoke and an axle tube, said connector portion having teeth arrayed thereabout adjacent to the teeth on the flange, and
- a clutch member comprising a clutch collar having inwardly directed teeth for selectively interconnecting the teeth on the flange and axle, said clutch collar being slidably mounted relative to the flange and connector portion of movement between a first position interlocking the flange and connector portion and second position permitting relatively free rotative movement therebetween.

13. The system of claim 12, which further comprises actuator means selectively operable by an operator remote from said wheel to move said clutch member between said first and second positions.

14. The system of claim 12, which further comprises an actuator selectively operable to induce a force operable to move the clutch member from one of said positions to the other of said positions, and biasing means acting against the clutch member to urge movement of the clutch member in the opposite direction, said biasing means generating less force than said actuator.

* * * * *